United States Patent
van der Westhuizen

(10) Patent No.: US 9,073,631 B1
(45) Date of Patent: Jul. 7, 2015

(54) FEATHERING-SPINDLE-BEARING LUBRICATION AND TEMPERATURE CONTROL

(75) Inventor: Jacob Johannes van der Westhuizen, South Jordan, UT (US)

(73) Assignee: GROEN BROTHERS AVIATION, INC., Salt Lake City, UT (US)

( * ) Notice: Subject to any disclaimer, the term of this patent is extended or adjusted under 35 U.S.C. 154(b) by 524 days.

(21) Appl. No.: 13/199,678

(22) Filed: Sep. 7, 2011

Related U.S. Application Data

(60) Provisional application No. 61/381,291, filed on Sep. 9, 2010, provisional application No. 61/403,099, filed on Sep. 9, 2010, provisional application No. 61/403,097, filed on Sep. 9, 2010, provisional application No. 61/381,313, filed on Sep. 9, 2010, provisional application No. 61/403,111, filed on Sep. 9, 2010, provisional application No. 61/381,347, filed on Sep. 9, 2010, provisional application No. 61/403,136, filed on Sep. 9, 2010, provisional (Continued)

(51) Int. Cl.
*B64C 27/32* (2006.01)
*B64C 27/18* (2006.01)
*B64C 27/02* (2006.01)

(52) U.S. Cl.
CPC ............ *B64C 27/32* (2013.01); *B64C 27/025* (2013.01); *B64C 27/18* (2013.01)

(58) Field of Classification Search
USPC ............ 244/6, 7 R, 7 C, 12.4, 17.11, 17.25; 184/7.1; 416/1, 95, 146 A, 174; 415/111, 112, 175, 177, 180, 229
See application file for complete search history.

(56) References Cited

U.S. PATENT DOCUMENTS

| | | | | |
|---|---|---|---|---|
| 2,455,313 A * | 11/1948 | Osofsky | ......................... | 416/95 |
| 2,601,463 A | 6/1952 | Stanley | | |
| 2,648,387 A * | 8/1953 | Doman | ......................... | 416/114 |
| 2,889,887 A * | 6/1959 | Stanley | ......................... | 416/1 |
| 3,237,698 A * | 3/1966 | Gandy | ......................... | 416/174 |
| 3,451,644 A * | 6/1969 | Laufer et al. | ......................... | 244/7 A |
| 3,494,424 A | 2/1970 | Stanley | | |
| 3,720,387 A * | 3/1973 | Foote | ......................... | 244/17.25 |
| 3,778,187 A * | 12/1973 | Wennberg | ......................... | 416/95 |
| 4,131,391 A * | 12/1978 | Robinson | ......................... | 416/140 |
| 4,589,611 A | 5/1986 | Ramme et al. | | |
| 5,316,442 A * | 5/1994 | Mouille | ......................... | 416/134 A |
| 5,934,873 A | 8/1999 | Greene | | |
| 5,984,635 A * | 11/1999 | Keller | ......................... | 416/20 A |
| 7,147,182 B1 | 12/2006 | Flanigan | | |
| 7,871,034 B2 * | 1/2011 | Karem | ......................... | 244/7 A |

OTHER PUBLICATIONS

Franklin D. Harris et al., The XV-1's Rotor System, AHS International, Jan. 21-24, 2004.
Franklin D. Harris, An Overview of Autogyros and the McDonnell XV-1 Convertiplane, NASA/CR, Oct. 2003.
David H. Hickey, NACA Research Memorandum, Full-Scale Wind-Tunnel Tests, National Advisory Committee for Aeronautics, May 17, 1956.

(Continued)

*Primary Examiner* — Joseph W Sanderson
(74) *Attorney, Agent, or Firm* — Pate Baird, PLLC

(57) ABSTRACT

A rotorcraft is disclosed. The rotorcraft may include an airframe, at least one engine connected to the airframe, and a rotor connected to the airframe. The rotor may include a hub, a rotor blade, and a feathering spindle connecting the rotor blade to the hub. The rotorcraft may further include a flow of oil passing proximate the feathering spindle. The flow of oil may cool the feathering spindle during take off and landing of the rotorcraft. Additionally, the flow of oil may heat the feathering spindle during travel of the rotorcraft at altitude.

18 Claims, 7 Drawing Sheets

Related U.S. Application Data application No. 61/403,134, filed on Sep. 9, 2010, provisional application No. 61/460,572, filed on Jan. 3, 2011, provisional application No. 61/403,098, filed on Sep. 9, 2010, provisional application No. 61/403,081, filed on Sep. 9, 2010, provisional application No. 61/403,135, filed on Sep. 9, 2010, provisional application No. 61/466,177, filed on Mar. 22, 2011, provisional application No. 61/409,475, filed on Nov. 2, 2010, provisional application No. 61/403,113, filed on Sep. 9, 2010, provisional application No. 61/409,478, filed on Nov. 2, 2010, provisional application No. 61/409,476, filed on Nov. 2, 2010, provisional application No. 61/409,482, filed on Nov. 2, 2010, provisional application No. 61/409,470, filed on Nov. 2, 2010, provisional application No. 61/517,413, filed on Apr. 19, 2011, provisional application No. 61/468,964, filed on Mar. 29, 2011, provisional application No. 61/409,487, filed on Nov. 2, 2010, provisional application No. 61/409,494, filed on Nov. 2, 2010, provisional application No. 61/456,219, filed on Nov. 2, 2010, provisional application No. 61/456,221, filed on Nov. 2, 2010, provisional application No. 61/456,220, filed on Nov. 2, 2010, provisional application No. 61/432,488, filed on Jan. 13, 2011, provisional application No. 61/506,572, filed on Jul. 11, 2011, provisional application No. 61/519,075, filed on May 16, 2011, provisional application No. 61/519,055, filed on May 16, 2011, provisional application No. 61/460,573, filed on Jan. 4, 2011, provisional application No. 61/461,223, filed on Jan. 13, 2011, provisional application No. 61/429,282, filed on Jan. 3, 2011, provisional application No. 61/429,289, filed on Jan. 3, 2011, provisional application No. 61/499,996, filed on Jun. 22, 2011, provisional application No. 61/575,196, filed on Aug. 17, 2011, provisional application No. 61/575,204, filed on Aug. 18, 2011.

(56) References Cited

OTHER PUBLICATIONS

S. Coham et al, XV-9A Hot Cycle Research Aircraft Program Summary Report, U.S. Army Aviation Material Laboratories, Fort Eustis, Virginia, Jun. 1966.
G. Warren Hall and Patrick M. Morris, Flight Testing the Fixed-Wing Configuration of the Rotor Systems Research Aircraft, NASA, Jun. 1985.
John D. Ballard et al., An Investigation of a Stoppable Helicopter Rotor with Circulation Control, Aug. 1980, NASA.
M. Mosher, Acoustic Measurements of the X-Wing Rotor, NASA Technical Memorandum 94292, Ames Research Center, 1983, Moffett Field, CA.
Arthur W. Linden and James C. Biggers, X-Wing Potential for Navy Applications, 1986.
William Willshire, Rye Canyon X-Wing Noise Test: One,Third Octave Band Data, NASA Technical Memorandum, Jan. 1983.
Gerald J. Healy, X-Wing Noise Data Acquisition Program, Feb. 1983, NASA.
Robert Sopher and James E. Duh, Prediction of Aeroelastic Response of a model X-Wing Rotor, Sikorsky Aircraft Division, United Technologies Corporation, 1986, Stratford, Connecticut.
Michael G. Gilbert and Walter A. Silva, The Effects of Aeroelastic Deformation on the Unaugmented Stopped-Rotor Dynamics of an X-Wing Aircraft, NASA, Jun. 1987.
Jessica A. Woods et al., Results of a Parametric Aeroelastic Stability Analysis of a Generic X-Wing Aircraft, NASA Technical Memorandum 101572, Apr. 1989.
D.N. Goldstein, et al., Rotorcraft convertible Engine Study, Final Report, 1963, NASA Lewis Research Center.
Franklin D. Harris et al, The XV-1's Rotor System, AHS International, Jan. 21-24, 2004.
S. Coham et al., XV-9A Hot Cycle Research Aircraft Program Summary Report, U.S. Army Aviation Material Laboratories, Fort Eustis, Virginia, Jun. 1966.

* cited by examiner

FEATHERING-SPINDLE-BEARING LUBRICATION AND TEMPERATURE CONTROL

RELATED APPLICATIONS

This application claims the benefit of U.S. Provisional Patent Application Ser. No. 61/381,313, filed on Sep. 9, 2010, U.S. Provisional Patent Application Ser. No. 61/403,081, filed on Sep. 9, 2010, U.S. Provisional Patent Application Ser. No. 61/403,097, filed on Sep. 9, 2010, U.S. Provisional Patent Application Ser. No. 61/403,099, filed on Sep. 9, 2010, U.S. Provisional Patent Application Ser. No. 61/403,111, filed on Sep. 9, 2010, U.S. Provisional Patent Application Ser. No. 61/403,113, filed on Sep. 9, 2010, U.S. Provisional Patent Application Ser. No. 61/403,135, filed on Sep. 9, 2010, U.S. Provisional Patent Application Ser. No. 61/409,470, filed on Nov. 2, 2010, U.S. Provisional Patent Application Ser. No. 61/409,478, filed on Nov. 2, 2010, U.S. Provisional Patent Application Ser. No. 61/456,220, filed on Nov. 2, 2010, U.S. Provisional Patent Application Ser. No. 61/466,177, filed on Mar. 22, 2011, U.S. Provisional Patent Application Ser. No. 61/468,964, filed on Mar. 29, 2011, U.S. Provisional Patent Application Ser. No. 61/506,572, filed on Jul. 11, 2011, U.S. Provisional Patent Application Ser. No. 61/517,413, filed on Apr. 19, 2011, U.S. Provisional Patent Application Ser. No. 61/519,055, filed on May 16, 2011, and U.S. Provisional Patent Application Ser. No. 61/519,075, filed on May 16, 2011, all of which are hereby incorporated by reference. This application incorporates by reference all of the following applications: U.S. Provisional Patent Application Ser. No. 61/381,291, filed on Sep. 9, 2010, U.S. Provisional Patent Application Ser. No. 61/381,347, filed on Sep. 9, 2010, U.S. Provisional Patent Application Ser. No. 61/403,136, filed on Sep. 9, 2010, U.S. Provisional Patent Application Ser. No. 61/403,134, filed on Sep. 9, 2010, U.S. Provisional Patent Application Ser. No. 61/460,572, filed on Jan. 3, 2011, U.S. Provisional Patent Application Ser. No. 61/403,098, filed on Sep. 9, 2010, U.S. Provisional Patent Application Ser. No. 61/409,475, filed on Nov. 2, 2010, U.S. Provisional Patent Application Ser. No. 61/409,476, filed on Nov. 2, 2010, U.S. Provisional Patent Application Ser. No. 61/409,482, filed on Nov. 2, 2010, U.S. Provisional Patent Application Ser. No. 61/409,487, filed on Nov. 2, 2010, U.S. Provisional Patent Application Ser. No. 61/409,494, filed on Nov. 2, 2010, U.S. Provisional Patent Application Ser. No. 61/456,219, filed on Nov. 2, 2010, U.S. Provisional Patent Application Ser. No. 61/456,221, filed on Nov. 2, 2010, U.S. Provisional Patent Application Ser. No. 61/432,488, filed on Jan. 13, 2011, U.S. Provisional Patent Application Ser. No. 61/460,573, filed on Jan. 4, 2011, U.S. Provisional Patent Application Ser. No. 61/461,223, filed on Jan. 13, 2011, U.S. Provisional Patent Application Ser. No. 61/429,282, filed on Jan. 3, 2011, U.S. Provisional Patent Application Ser. No. 61/429,289, filed on Jan. 3, 2011, U.S. Provisional Patent Application Ser. No. 61/499,996, filed on Jun. 22, 2011, U.S. Provisional Patent Application Ser. No. 61/575,196, filed on Aug. 17, 2011, and U.S. Provisional Patent Application Ser. No. 61/575,204, filed on Aug. 17, 2011, all of which are hereby incorporated by reference.

Additionally, this patent application hereby incorporates by reference U.S. Pat. No. 5,301,900 issued Apr. 12, 1994 to Groen et al., U.S. Pat. No. 1,947,901 issued Feb. 20, 1934 to J. De la Cierva, and U.S. Pat. No. 2,352,342 issued Jun. 27, 1944 to H. F. Pitcairn.

RIGHTS OF U.S. GOVERNMENT

This invention was made with Government support under Agreement No. HR0011-06-9-0002 awarded by DARPA. The Government has certain rights in the invention.

BACKGROUND

1. The Field of the Invention

This invention relates to rotorcraft and, more particularly, to novel systems and methods for lubricating, heating, and cooling feathering spindles on high-advance-ratio rotorcraft.

2. The Background Art

Rotorcraft rely on a rotating wing to provide lift. In contrast, fixed-wing aircraft rely on air flow over a fixed wing to provide lift. Fixed-wing aircraft must therefore achieve a minimum ground velocity on takeoff before the lift on the wing is sufficient to overcome the weight of the plane. Fixed-wing aircraft therefore generally require a long runway along which to accelerate to achieve this minimum velocity and takeoff.

In contrast, rotorcraft can take off and land vertically or along short runways inasmuch as powered rotation of the rotating wing provides the needed lift. This makes rotorcraft particularly useful for landing in urban locations or undeveloped areas without a proper runway.

The most common rotorcraft in use today are helicopters. A helicopter typically includes an airframe, housing an engine and passenger compartment, and a rotor, driven by the engine, to provide lift. Forced rotation of the rotor causes a reactive torque on the airframe. Accordingly, conventional helicopters require either two counter rotating rotors or a tail rotor in order to counteract this reactive torque.

Another type of rotorcraft is the autogyro. An autogyro aircraft derives lift from an unpowered, freely rotating rotor comprising two or more rotor blades. The energy to rotate the rotor results from a windmill-like effect of air passing through the underside of the rotor (i.e., autorotation of the rotor). The Bernoulli effect of the airflow moving over the rotor blade surface creates lift. The forward movement of the aircraft comes in response to a thrusting engine such as a motor driven propeller mounted fore or aft.

During the early years of aviation, autogyro aircraft were proposed to avoid the problem of aircraft stalling in flight and to reduce the need for runways. In autogyro aircraft, the relative airspeed of the rotor blades may be controlled or influenced somewhat independent of the forward airspeed of the autogyro, allowing slow ground speed for takeoff and landing, and safety in slow-speed flight.

Various autogyro devices in the past have provided some means to begin rotation of the rotor prior to takeoff (i.e., prerotation). Prerotation may minimize the takeoff distance down a runway. One type of autogyro is the "gyrodyne." Examples of such aircraft are the XV-1 convertiplane tested in 1954 and the Rotodyne built by Fairey Aviation in 1962. The gyrodyne includes a thrust source providing thrust in a flight direction and a rotor providing autorotative lift at cruising speeds. Jet engines located on the tip of each rotor blade provided rotation of the rotor during takeoff, landing, and hovering.

Although typical rotorcraft provide the significant advantage of vertical takeoff and landing (VTOL), they are much more limited in their maximum flight speed than are fixed-wing aircraft. One reason that prior rotorcraft are unable to achieve high flight speed is a phenomenon known as "retreating blade stall."

In a fixed-wing aircraft, all wings move forward in fixed relation with respect to one another and the airframe. However, as a rotorcraft moves in a flight direction, rotation of the rotor causes each blade thereof to be either "advancing" or "retreating." A blade is advancing if it is moving in the same direction as the flight direction. A blade is retreating if it is moving opposite the flight direction. Thus, the velocity of any point on any blade is the velocity of that point, with respect to the airframe, plus the velocity of the airframe.

Rotor blades are airfoils that provide lift based on the speed of air flow thereover. Accordingly, the advancing blade typically experiences much greater lift than the retreating blade. If left uncheck, this disproportionate lift may render the rotorcraft unflyable. One solution to this problem is allowing the rotor blades to "flap." Flapping enables rotorcraft to travel in a direction substantially perpendicular to the axis of rotation of the rotor.

With flapping, an advancing blade is allowed to fly or flap upward in response to the increased air speed thereover, thereby reducing the blade's angle of attack. This, in turn, reduces the lift generated by the advancing blade. A retreating blade experiences less air speed and tends to fly or flap downward such that its angle of attack is increased. This, in turn, increases the lift generated by the retreating blade. In this manner, flapping balances the lift generated by the advancing and retreating blades.

However, lift equalization due to flapping is limited by retreating blade stall. As noted above, flapping of the rotor blades increases the angle of attack of the retreating blade. At certain higher speeds in the direction of flight, the increase in the blade angle of attack required to equalize lift results in loss of lift (stalling) of the retreating blade.

A second limit on the speed of rotorcraft is the drag at the tips of the rotor blades. The tip of the advancing blade is moving at a speed equal to the speed of the aircraft relative to the surrounding air, plus the speed of the tip of the blade with respect to the aircraft. Thus, the speed at the tip of an advancing blade is equal to the sum of the flight speed of the rotorcraft plus the product of the length of the blade and the angular velocity of the rotor.

In helicopters, the rotor must rotate to provide both upward lift and thrust in the direction of flight. Increasing the speed of a helicopter increases the air speed at the tip, both because of the increased flight speed as well as the increased angular velocity of the rotors required to provide supporting thrust. The speed at the tip of the advancing blade could therefore approach the speed of sound, even when the flight speed of the rotorcraft was actually much less. As the air speed over the tip approaches the speed of sound, the drag on the blade becomes greater than the engine can overcome. Accordingly, helicopters are quite limited in how fast they can fly.

In autogyro aircraft, the tips of the advancing blades are also subject to this increased drag, even for flight speeds much lower than the speed of sound. The tip speed for an autogyro is typically smaller than that of a helicopter, for a given airspeed, since the rotor is not driven. Nevertheless, the same drag increase occurs eventually.

A third limit on the speed of rotorcraft is reverse air flow over the retreating blade. As noted above, the retreating blade is traveling opposite the flight direction with respect to the airframe. At certain high speeds in the direction of flight, portions of the retreating blade may move rearward, with respect to the airframe, slower than the flight speed of the airframe. Accordingly, the direction of air flow over those portions of the retreating blade is reversed from that typically designed to generate positive lift.

Rather then generating positive lift, reverse air flow may impose negative lift, or a downward force, on the retreating blade. That is, an airfoil with positive angle of attack in a first direction has a negative angle of attack in a second direction, opposite the first direction.

The ratio of air speed of a rotorcraft in the direction of flight to the maximum corresponding air speed at the tips of the rotor blades is known as the "advance ratio." The maximum advance ratio of currently available rotorcraft is less than 0.5. For most helicopters, the maximum achievable advance ratio is between about 0.3 and 0.4. Accordingly, current rotorcraft are limited to a top flight speed of about 200 miles per hour (mph) or less.

In view of the foregoing, it would be an advancement in the art to provide a rotorcraft capable of vertical takeoff and landing and flight speeds well in excess of 200 mph. Moreover, to accomplish such a fete, it would be an advance in the art to find a means to create, fit, and maintain components of a rotor in a more precise arrangement than has heretofore been implemented in any rotor craft. This would be of particular value to accomplish under a variety of ambient conditions and operational conditions, from startup, through takeoff and flight, to the extremes of flight conditions.

BRIEF SUMMARY OF THE INVENTION

In view of the foregoing, in accordance with the invention as embodied and broadly described herein, a method and apparatus are disclosed in one embodiment of the present invention as including a feathering spindle. In selected embodiments, a rotor of a rotorcraft may define axial, radial, and circumferential directions. The rotor may include a hub with two or more rotor blades extending in the radial direction away therefrom. A feathering spindle in accordance with the present invention may provide an interface between a hub and a rotor blade.

In selected embodiments, a feathering spindle may secure a rotor blade substantially rigidly to the hub with respect to certain directions or degrees of freedom. For example, a feathering spindle may prevent or strongly resist translation in the radial direction, translation in the axial direction, and rotation about an axis extending in the axial direction of a rotor blade, with respect to a hub. This rigidity may provide predictable communication of various loads (e.g., lift, flapping, lead, lag, and vibration loads, and the like) from the rotor blade to the hub, where some or all of the loads may be resolved.

A feathering spindle may also permit and facilitate certain motion between a rotor blade and a hub. Specifically, a feathering spindle may support feathering of a rotor blade. That is, a feathering spindle may permit and facilitate rotation of a rotor blade with respect to a hub about an axis extending in the radial direction. Accordingly, a feathering spindle may enable adjustments to the pitch (i.e., angle of attack) of a rotor blade.

In selected embodiments, a rotor blade may include a tip jet (i.e., a small jet engine located proximate the tip of the rotor blade) for powering rotation of a rotor during takeoff, landing, hovering, etc. When thrust from the tip jet is needed, compressed air may be feed to the tip jet from an interior conduit in the corresponding rotor blade. This interior conduit may extend from the root to the tip of the rotor blade. In certain embodiments, a hub may act as a manifold, feeding compressed air into the interior conduits of the various rotor blades.

A feathering spindle and corresponding rotor blade in accordance with the present invention may be configured to allow the flow of compressed air through the spindle and down the rotor blade to the tip jet. In certain embodiments, this compressed air may be at a temperature of about 205 degrees Celsius (400 degrees Fahrenheit). Accordingly, the compressed air may heat a feathering spindle during the time the rotor is powered. In selected embodiments, a layer of thermal insulation may be applied to the surface of the interior conduit formed within a rotor blade. The layer may protect the rotor blade from the high temperature of the compressed air passing therethrough and reduce the rate at which heat flows from the compressed air into the feathering spindle and surrounding components.

Once the flow of compressed air has stopped (e.g., once the rotor has transitioned to autorotation) the surrounding atmosphere may cool a feathering spindle. The higher the altitude, the greater the cooling. For example, at certain altitudes, the atmospheric temperatures may typically be as low as negative 54 degrees Celsius (negative 65 degrees Fahrenheit).

In selected embodiments, the root of a rotor blade may be positioned and secured within a feathering spindle. One or more protective bands fitted onto the root of a rotor blade may form an interface between the rotor blade and the corresponding feathering spindle. The material selected for the protective bands may have a similar coefficient of thermal expansion to that of the material (e.g., carbon composite) forming the rotor blade.

A feathering spindle may include one or more bearings forming an interface between the rest of the feathering spindle and a corresponding hub. In certain embodiments, a feathering spindle may include two bearings. A feathering spindle may further include a tension sleeve. The tension sleeve may support the inner races of the two bearings. The outer races of the two bearings may engage the hub. The bearings may be preloaded by a preload mechanism (e.g., a threaded nut) engaging the tension sleeve.

A rotorcraft in accordance with the present invention may include an oil circulation system. The system may pass oil through an annular cavity defined by and between the hub and feathering spindle. Oil in the annular cavity may lubricate the bearings of the feathering spindle. The oil may also regulate the temperature of the various parts of a feathering spindle. For example, a feathering spindle may be either cooled or warmed by the oil.

Seals in dual configurations at each end of a feathering spindle may keep the oil in the annular cavity. Drain holes between the seals of each set of double seals may ensure there is no leak into the inside of the hub or to the environment outside, as any such leak may present a potential fire hazard.

A hub, feathering spindle, and rotor blade arrangement in accordance with the present invention may provide an assembly that is rigid in the desired directions or degrees of freedom throughout the design temperature and load ranges. Accordingly, the hub, feathering spindle, and rotor blade arrangement may ensure that the rotor meets the flapping, lead-lag, and torsional stiffness requirements throughout the flight envelop. This may be accomplished by pre-loading of the bearings of the feathering spindle in the radial direction and suitable interference fits between the root of the rotor blade, tension sleeve, bearings, and the hub. These, together with the temperature regulation imposed by the oil circulation system, may ensure that thermal expansion and contraction will not overload any components nor produce clearances negating the required rotor stiffness.

While an oil circulation system may not hold a feathering spindle at a constant temperature, it may reduce the temperature range in which a feathering spindle must operate. This temperature range may be selected or controlled such that the pre-loading of the bearings and interference fits between components are sufficient to accommodate, resolve, or both, the thermal expansion and contraction associated with the temperature range.

During powering of a rotor (e.g., operation of the tip jets), an oil circulation system may both lubricate the feathering spindle and remove heat therefrom. Conversely, during autorotative flight at low atmospheric temperatures, an oil circulation system may both lubricate the feathering spindle and transfer heat thereto. An oil circulation system, may include components that selectively heat or cool the flow of oil passing therewithin.

BRIEF DESCRIPTION OF THE DRAWINGS

The foregoing features of the present invention will become more fully apparent from the following description and appended claims, taken in conjunction with the accompanying drawings. Understanding that these drawings depict only typical embodiments of the invention and are, therefore, not to be considered limiting of its scope, the invention will be described with additional specificity and detail through use of the accompanying drawings in which:

DETAILED DESCRIPTION OF SELECTED EMBODIMENTS

Figure 1:
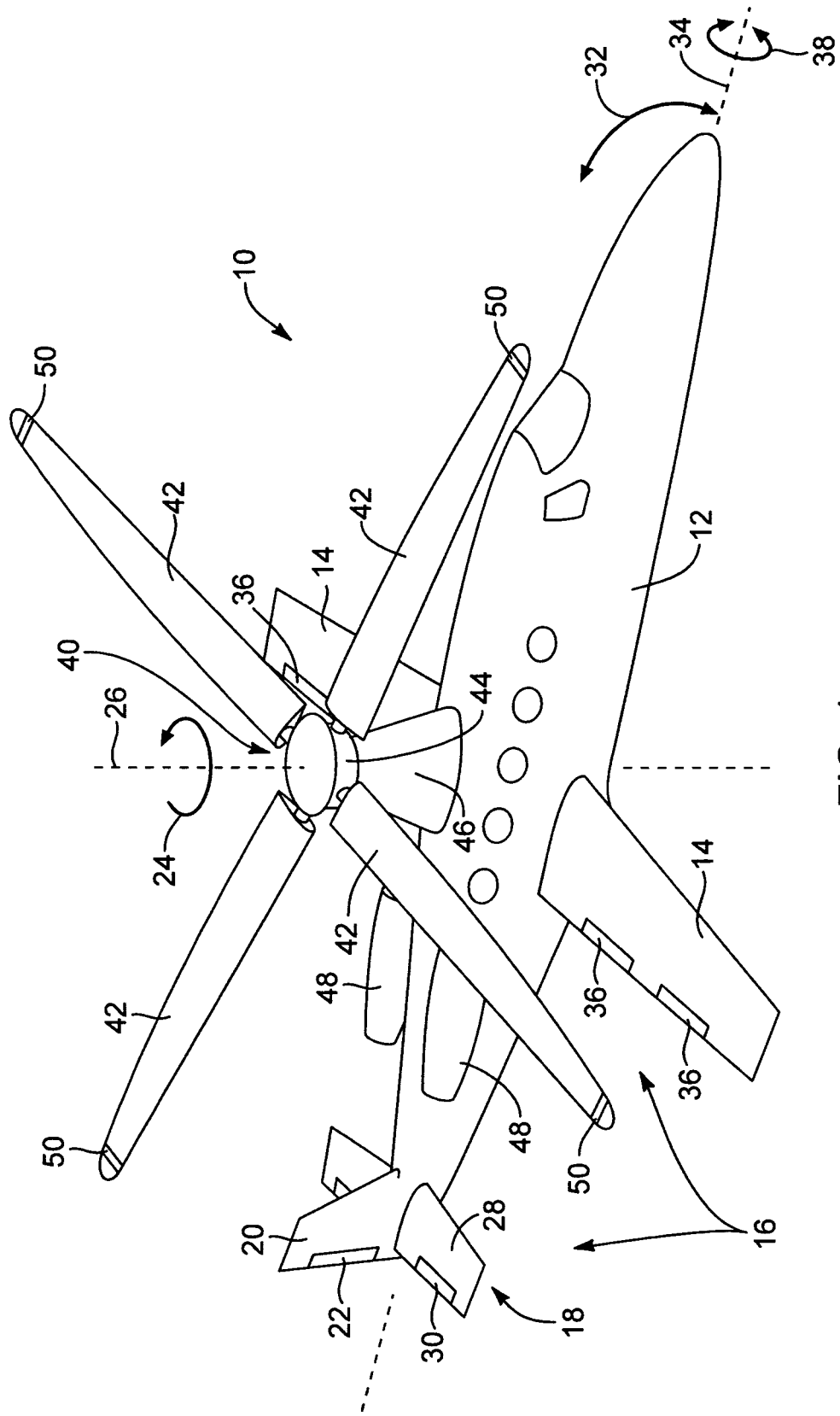
FIG. 1 is a perspective view of a rotorcraft in accordance with one embodiment of the present invention.

It will be readily understood that the components of the present invention, as generally described and illustrated in the drawings herein, could be arranged and designed in a wide variety of different configurations. Thus, the following more detailed description of the embodiments of the system and method of the present invention, as represented in the drawings, is not intended to limit the scope of the invention, as claimed, but is merely representative of various embodiments of the invention. The illustrated embodiments of the invention will be best understood by reference to the drawings, wherein like parts are designated by like numerals throughout.

Referring to FIG. 1, a rotorcraft 10 in accordance with the present invention may include an airframe 12 defining a cabin for carrying an operator, passengers, cargo, or the like. The airframe 12 may include one or more fixed wings 14 or airfoils 14 providing lift to the rotorcraft 10. The wings 14 may be configured such that they provide sufficient lift to overcome the weight of the rotorcraft 10 (or any significant portion thereof) only at comparatively high speeds.

That is, a rotorcraft 10 may be capable of vertical takeoff and landing (VTOL) and may not need lift from the fixed wings 14 at low speeds (e.g., below 50 mph or even 100 mph). Accordingly, the wings 14 may be made smaller than those of fixed-wing aircraft requiring a high velocity takeoff. The smaller wings 14 may result in lower drag at higher velocities. In some embodiments, the wings 14 may provide sufficient lift to support at least 50 percent, preferably about 90 percent, of the weight of the rotorcraft 10 at air speeds above 200 mph.

Control surfaces 16 may form part of an airframe 12. For example a tail structure 18 may include one or more vertical stabilizers 20 and one or more rudders 22. The rudders 22 may be adjustable to control yaw 24 of the rotorcraft 10 during flight. As known in the art, yaw 24 is defined as rotation about a vertical axis 26 of the rotorcraft 10. In the illustrated embodiment, the rudders 22 may comprise hinged portions of the vertical stabilizers 20.

The tail structure 18 may further include a horizontal stabilizer 28 and an elevator 30. The elevator 30 may be adjustable to alter pitch 32 of the rotorcraft 10. As known in the art, pitch 32 is defined as rotation about an axis extending laterally with respect to the airframe 10. In the illustrated embodiment, the elevator 30 is a hinged portion of the horizontal stabilizer 28. In some embodiments, twin rudders 22 may be positioned at an angle relative to the vertical axis 26 and serve both to adjust or control yaw 24 and pitch 32 of the rotorcraft 10.

The control surfaces 16 may also include ailerons 36 on the wings 14. Ailerons 36 may be used to control roll 38 of the airplane. As known in the art, roll 38 is defined as rotation about the longitudinal axis 34 of the rotorcraft 10.

Lift during vertical takeoff and landing, and for augmenting lift of the wings 14 during flight, may be provided by a rotor 40. A rotor 40 may comprise a number of individual rotor blades 42 extending radially away from a hub 44. The hub 44 may be coupled to a mast 46. The mast may extend to connect the hub 44 to the rest of the airframe 12.

Figure 2:
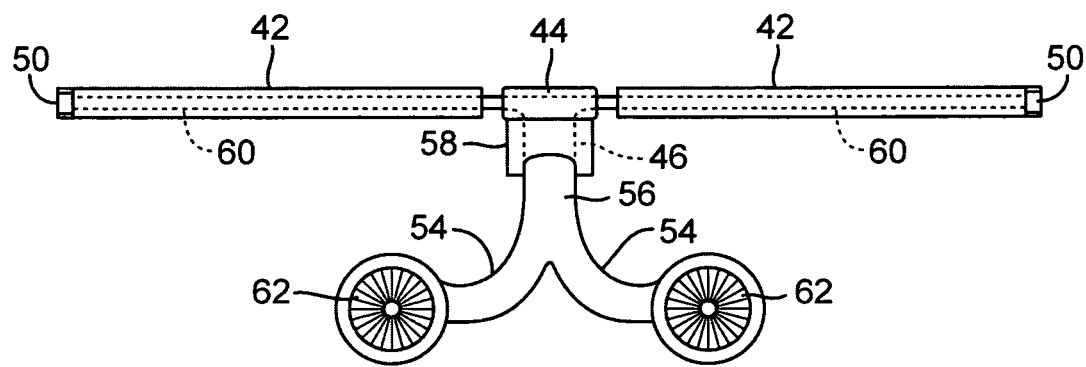
FIG. 2 is a schematic front elevation view of a compressed or otherwise pressurized air supply for tip jets in accordance with one embodiment of the present invention.

Referring to FIG. 2, a rotor 40 may be coupled to one or more engines 48 housed in a fuselage portion of the airframe 12 or in one or more adjacent nacelles. The engines 48 may provide thrust during flight of the rotorcraft 10. The engines 48 may also generate compressed air for the tip jets 50.

For example, in selected embodiments, the engines 48 may comprise one or more bypass turbines 62. All or a portion of the bypass air from the turbines 62 may be directed to the tip jets 50. Alternatively, the engines 48 may drive one or more auxiliary compressors, which in turn may provide the compressed air for the tip jets 50. Using the compressed air, the tip jets 50 may power the rotor 40 during takeoff, landing, hover or whenever the flight speed of the rotorcraft 10 is too low for sufficient lift from autorotation of the rotor 40.

In selected embodiments, the compressed air generated by the engines 48 may be conducted to the tip jets 50 via one or more ducts 54. For example, bypass air from one or more bypass turbines 62 may be transmitted through ducts 54 to a plenum 56. The plenum 56 may be in fluid communication with a mast 46 that is hollow or has another passage to provide for air conduction. For example, a mast fairing 58 positioned around the mast 46 may provide one or both of an air channel and a low drag profile for the mast 46. The mast 46 or mast fairing 58 may be in fluid communication with a hub 44. Finally, the hub 44 may be in fluid communication with an interior conduit 60 within each of the various rotor blades 42. Accordingly, the compressed air may travel radially within the interior conduits 60 to feed the corresponding tip jets 50.

Figure 3:
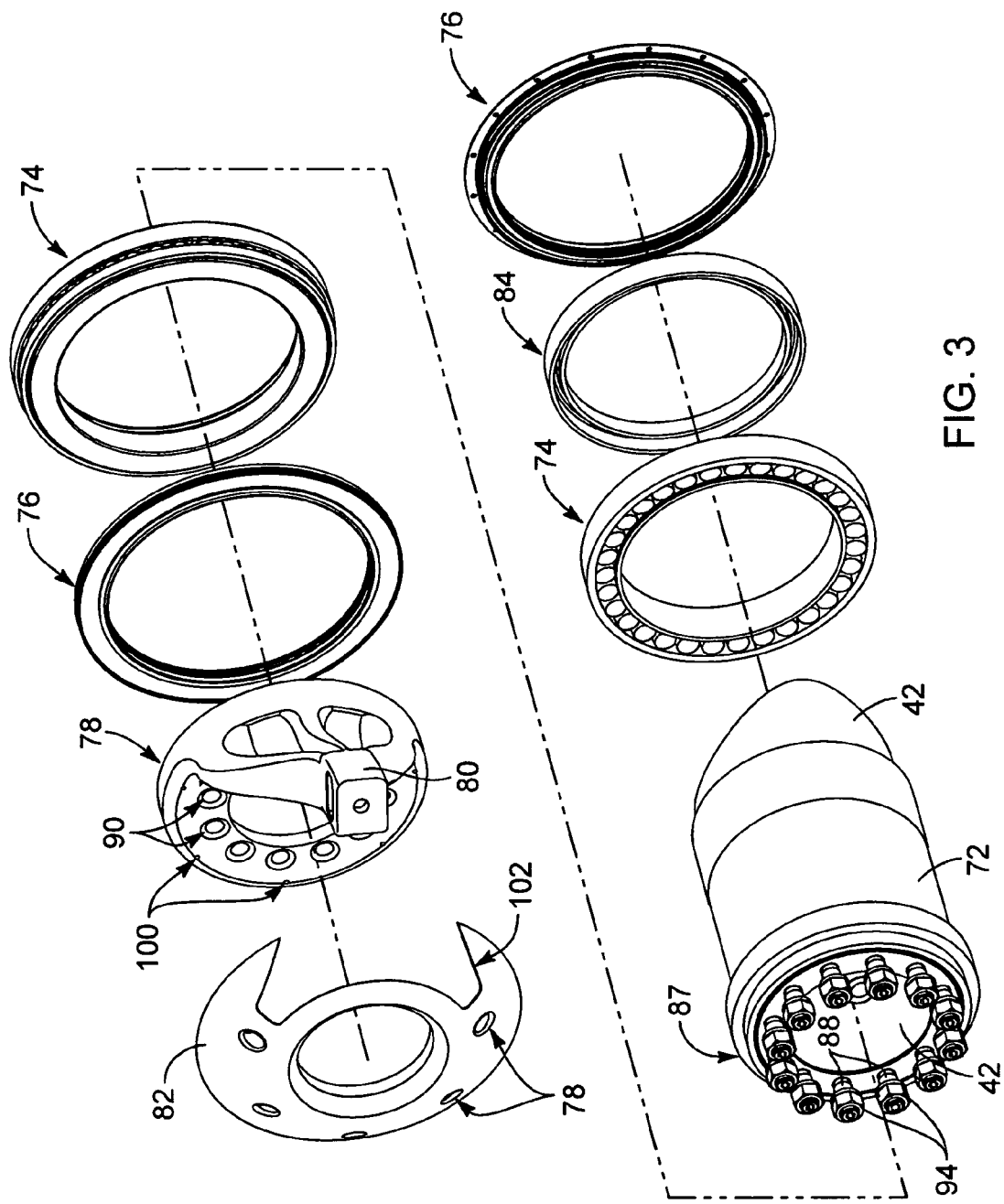
FIG. 3 is a perspective, exploded view of one embodiment of a feathering spindle in accordance with the present invention.
Figure 4:
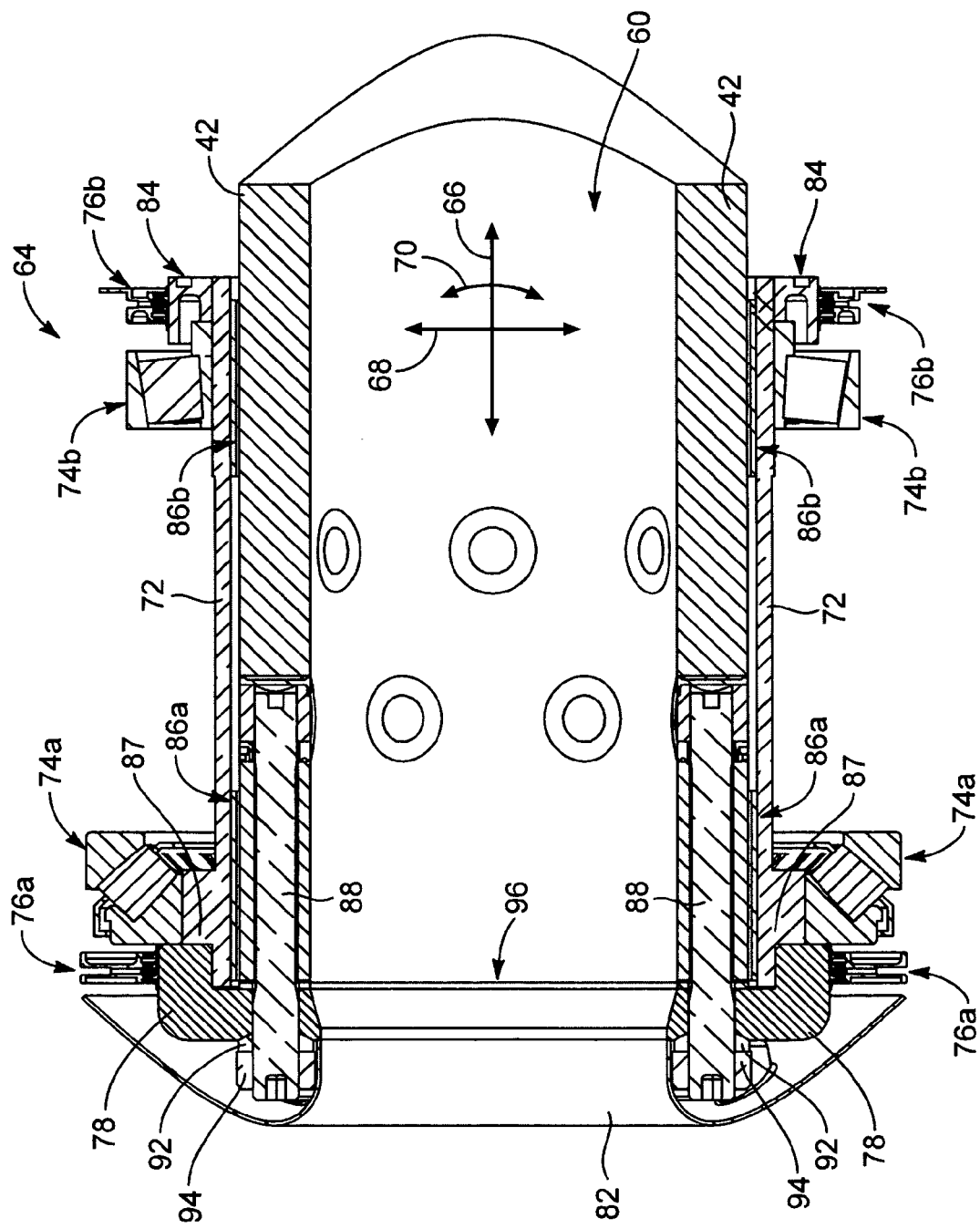
FIG. 4 is a side, cross-sectional view of the feathering spindle of FIG. 3.

Referring to FIGS. 3 and 4, a feathering spindle 64 in accordance with the present invention may provide an interface between a hub 44 and a rotor blade 42. In selected embodiments, a feathering spindle 64 may secure a rotor blade 42 rigidly to the hub 44 with respect to certain directions or degrees of freedom. For example, a feathering spindle 64 may prevent or resist translation in the radial direction 66, translation in the axial direction 68, rotation about an axis extending in the axial direction 68, and rotation 70 about an axis orthogonal to the axial direction 68, etc. of a rotor blade 42 with respect to a hub 44. This rigidity may provide predictable communication of various loads (e.g., lift, flapping, lead, lag, and vibration loads, and the like) from the rotor blade 42 to the hub 44, where some or all of the loads may be resolved.

A feathering spindle 64 may also permit and facilitate certain motion between a rotor blade 42 and a hub 44. Specifically, a feathering spindle 64 may support feathering of a rotor blade 42. That is, a feathering spindle 64 may permit and facilitate rotation of a rotor blade 42 with respect to a hub 44 about an axis extending in the radial direction 66. Accordingly, a feathering spindle 64 may enable adjustments to the pitch (i.e., angle of attack) of a rotor blade 42.

In selected embodiments, a tensioning sleeve 72 may form the backbone of a feathering spindle 64. Accordingly, a tensioning sleeve 72 may provide the base component to which the other components of a feathering spindle 64 may secure. The other components of a feathering spindle 64 may include one or more bearings 74, one or more seals 76, a thrust flange 78, a pitch arch 80, a fairing 82, and a preload mechanism 84.

The bearings 74 of a feathering spindle 64 may form the interface between a tensioning sleeve 72 and a hub 44. The bearings 74 may enable the tensioning sleeve 72 to rotate with respect to the hub 44 about an axis extending in the radial direction 66. In selected embodiments, the bearings 74 may comprise a first bearing 74a and a second bearing 74b. The inner races of the first and second bearings 74a, 74b may rest on or engage the tensioning sleeve 72. The outer races of the first and second bearings 74a, 74b may rest on or engage the hub 44. In selected embodiments, the first and second bearings 741, 74b may each comprise a tapered roller bearing.

A preload mechanism 84 may control the amount of force urging the first and second bearings 74a, 74b toward one another. Accordingly, a preload mechanism 84 may control the amount of force with which a portion of the hub 44 is clamped between the first and second bearings 74a, 74b. In selected embodiments, a preload mechanism 84 may comprise a threaded fastener 84 or nut 84 threadedly engaging an end of a tension sleeve 72. As the threaded fastener 84 advances onto the tensioning sleeve 72, the distance between the first and second bearings 74a, 74b may decrease. Once a hub 44 resists or prevents further decreases in the distance between the first and second bearings 741, 74b, further rotation of the threaded fastener 84 may generate a preload clamping a portion of the hub 44 between the first and second bearings 74a, 74b.

The root of a rotor blade 42 may be positioned and secured within a feathering spindle 64. For example, in selected embodiments, a tensioning sleeve 72 of a feathering spindle 64 may define an interior cavity extending in the radial direction 66 therethrough. The tensioning sleeve 72 may receive (e.g., coaxially) the root of the rotor blade 42 within this interior cavity. One or more protective bands 86a, 86b may be fitted onto the root of a rotor blade 42 and form an interface between rotor blade 42 and an interior surface of a corresponding tensioning sleeve 72. The material selected for the protective bands 86a, 86b may have a similar coefficient of thermal expansion as the material (e.g., carbon composite) forming the rotor blade 42.

A thrust flange 78 may provide a location for a rotor blade 42 to engage a feathering spindle 64. Additionally, a thrust flange 78 may provide a mechanism for transferring loads from the rotor blade 42 (e.g., centrifugal loads) through the bearings 74a to the hub 44.

A thrust flange 78 may be connected to a tensioning sleeve 72 in any suitable manner. In selected embodiments, a thrust flange 78 may be connected to a tensioning sleeve 72 via a threaded engagement therebetween. In such embodiments, a tensioning sleeve 72 may include a shoulder 87 against which a thrust flange 78 may abut once a proper engagement between the tensioning sleeve 72 and thrust flange 78 is achieved or reached.

In certain embodiments, the shoulder 87 may provide a location for the inner race of a first bearing 74a to engage or contact the tensioning sleeve 72. Accordingly, a thrust flange 78 may contact the first bearing 74a and transfer loads to an inner race thereof. With the outer race of the first bearing 74a contacting and abutting a portion of the hub 44, the first bearing 74a may transfer or communicate the loads imposed thereon to the hub 44, where they may be resolved.

The root of a rotor blade 42 may include an array of bolts 88 extending in the radial direction 66. A thrust flange 78 may include an array of apertures 90. Each aperture 90 of the array may be sized and positioned to receive a corresponding bolt 88. Once each bolt 88 has been inserted within a corresponding aperture 90, one or more washers 92 (e.g., centering or convex washers) may be installed on each bolt 88. Next, threaded fasteners 94 may be applied to the bolts 88. Tightening of the fasteners 94 may secure the rotor blade 42 to the feathering spindle 64.

In certain embodiments, an interface ring 96 may be placed between the end of a rotor blade 42 and the corresponding thrust flange 78. The interface ring 96 may be formed of compliant material. Alternatively, the interface ring 96 may comprise a composite bearing plate 96 bonded onto the root of the rotor blade 42. Accordingly, the interface ring 96 may remove or relieve any stress risers (e.g., direct loading of certain composite fibers) that may otherwise result from irregularities in the end of the rotor blade 42, the corresponding abutting surface of the thrust flange 78, or both.

In selected embodiments, a thrust flange 78 in accordance with the present invention may have a pitch arm 80 connected thereto or monolithically formed therewith. A pitch arm 80 may provide a location and appropriate leverage to control the pitch of a rotor blade 42 connected thereto. One or more control mechanisms may engage or connect to an end of a pitch arm 80 and impart motion thereto. In certain embodiments, this motion may be primarily linear. A pitch arm 80 may convert such linear motion into rotation of the corresponding rotor blade 42 with respect to the hub 44 about an axis extending in the radial direction 66.

A feathering spindle 64 and corresponding rotor blade 42 in accordance with the present invention may be configured to allow the flow of compressed air through the feathering spindle 64 and into an interior conduit 60 of the rotor blade 42. A feathering spindle 64 may include a fairing 82 to ease or smooth the flow of air into the interior conduit 60 of the rotor blade 42. In addition to reducing the drag imposed on the flow of air, the fairing 82 may also shield, to a certain extent, the thrust flange 78 and other components of a feathering spindle 64 (e.g., a first seal 76a) from the heat of the flow of compressed air.

A fairing 82 in accordance with the present invention may include various apertures 98 facilitating securement of the fairing 82 to a thrust flange 78. The apertures 98 may be countersunk so that any fasteners extending therethrough may not interrupt the generally smooth exterior surface exhibited by the fairing 82. In selected embodiments, threaded fasteners may extend through the apertures 98 to engage corresponding threaded apertures 100 formed in the thrust flange 78. A fairing 82 may also include an aperture 102 or notch 102 enabling the pitch arm 80 to extending past or through the fairing 82 into the interior of the corresponding hub 44.

One or more seals 76 may define an enclosed cavity between a feathering spindle 64 and a hub 44. In selected embodiments, a feathering spindle 64 may include two seals 76a, 76b. A first seal 76a may be positioned proximate or extend from a thrust flange 82. A second seal 76b may be positioned proximate or extend from a preload mechanism 84. Each seal 76a, 76b may comprise a double seal with a drain hole located therebetween. The seals 76a, 76b may prevent any oil from inadvertently escaping the enclosed cavity.

Figure 5:
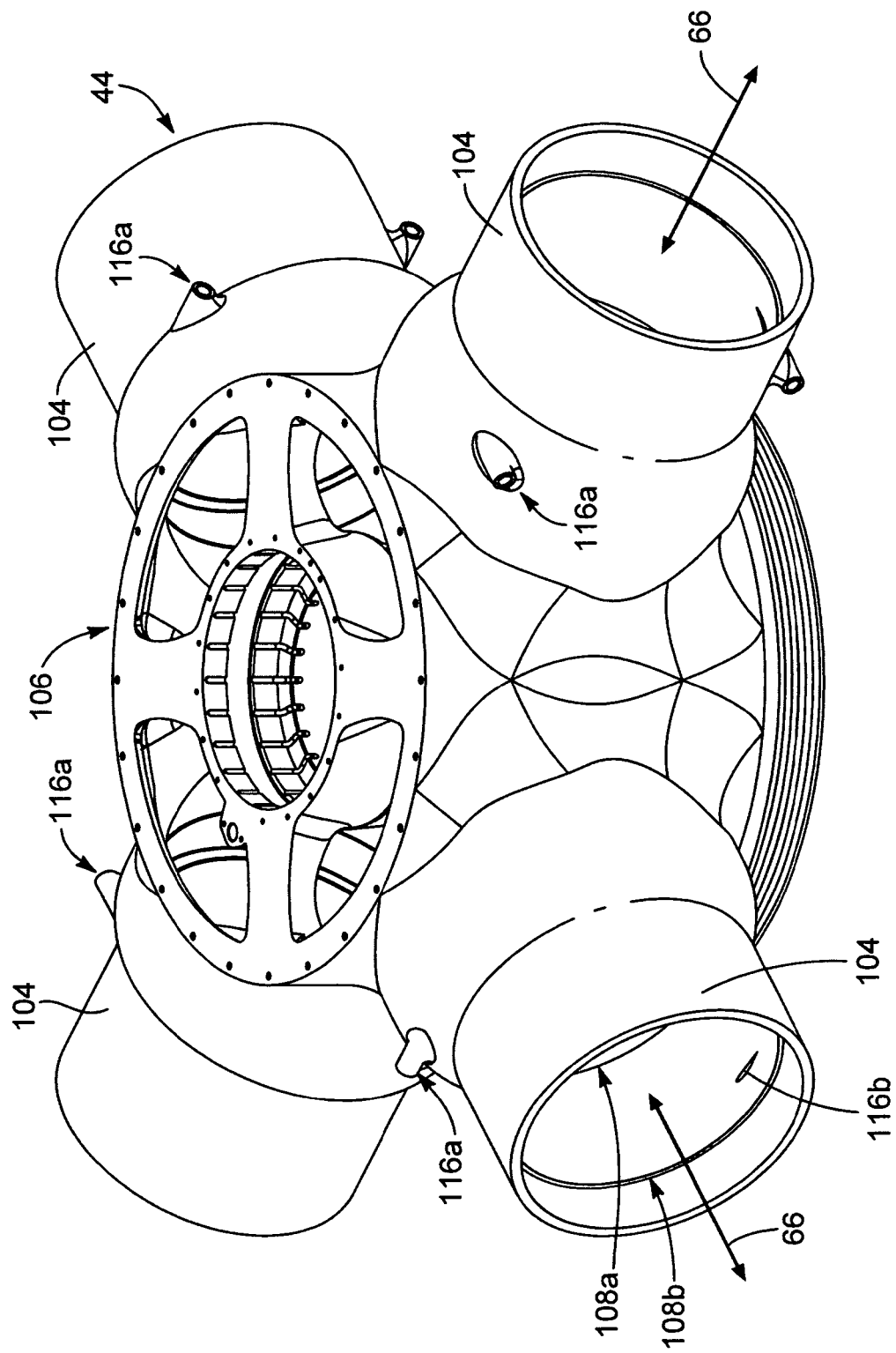
FIG. 5 is a perspective view of one embodiment of a rotor hub in accordance with the present invention.
Figure 6:
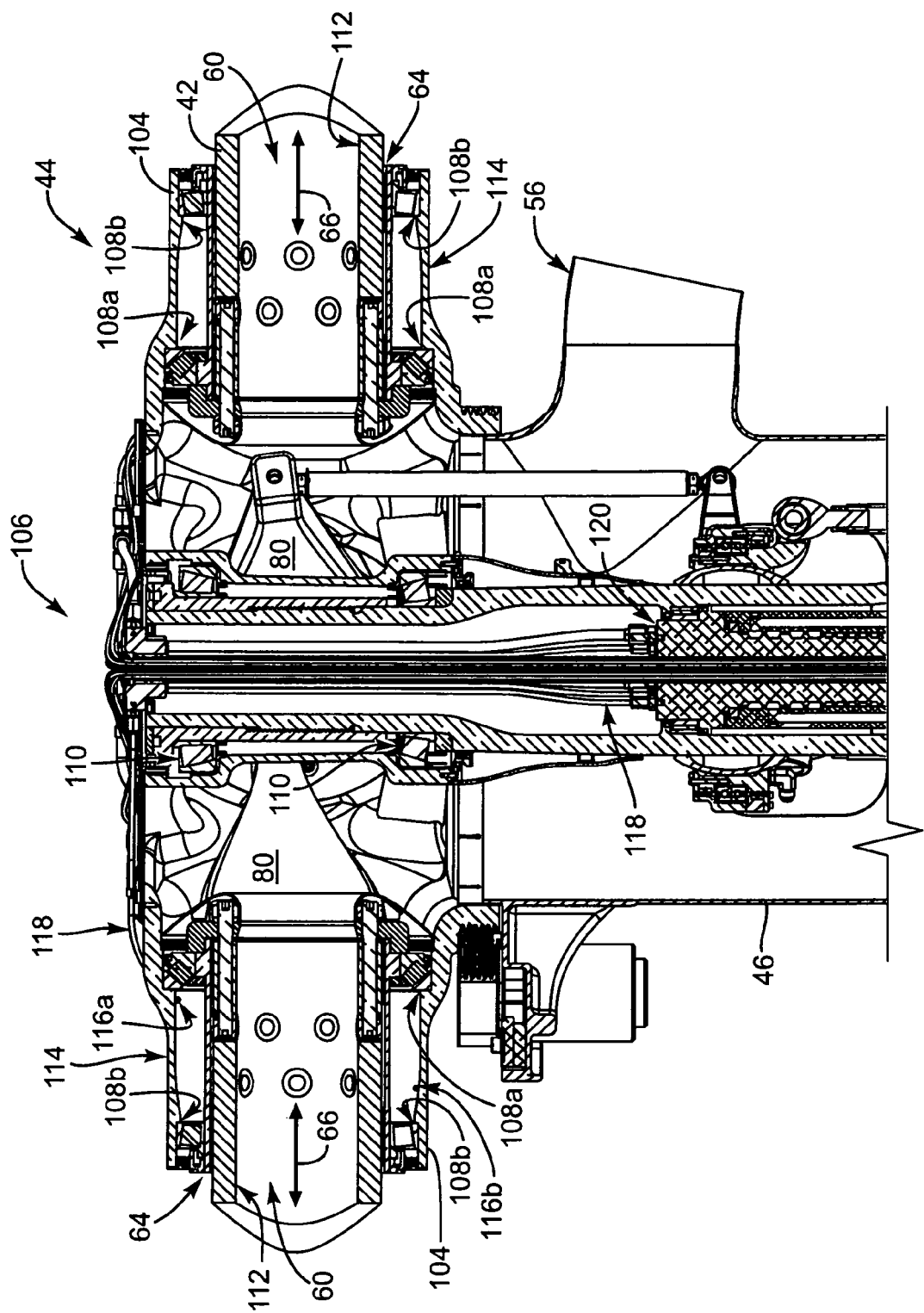
FIG. 6 is a side, cross-sectional view of a rotor in accordance with the present invention showing multiple feathering spindles of FIG. 3 installed in the rotor hub of FIG. 5.

Referring to FIGS. 5 and 6, a hub 44 in accordance with the present invention may include multiple spindle supports 104 extending in the radial direction 66 away from a central portion 106. Each spindle support 104 may receive and retain a different feathering spindle 64 and corresponding rotor blade 42. In the illustrated embodiment, the rotor 40 includes four spindle supports 104.

A spindle support 104 may include multiple shoulders 108 for engaging, abutting, retaining, or the like one or more bearings 74 of a feathering spindle 64. In selected embodiments, each spindle support 104 may include two such shoulders 108a, 108b. The first shoulder 108a may be sized and positioned to engage or abut a first bearing 74a. The second shoulder 108b may be sized and positioned to engage or abut a second bearing 74b. Accordingly, the first and second shoulders 108a, 108b may define the portion of the hub 44 clamped between the first and second bearings 74a, 74b by a preload mechanism 84.

In selected embodiments, a hub 44 may rotate about a mast 46. This rotation may be enabled by one or more mast bearings 110. A mast 46 may cooperate with a hub 44 to form a manifold. A flow of compressed air generated by one or more engines 48 may be delivered to this manifold by a plenum 56 connected to the mast 46. After entering the manifold, the flow of compressed air may divide as it passes through the various feathering spindles 64 and enters the internal conduits 60 of the corresponding rotor blades 42.

The flow of compressed air may typically be at a temperature of about 205 degrees Celsius (400 degrees Fahrenheit). Accordingly, the compressed air may heat a feathering spindle 64 during the time the rotor 40 is powered. In selected embodiments, a layer of thermal insulation may be applied to the surface 112 of the interior conduit 60 formed within a rotor blade 42. The layer may protect the rotor blade 42 from the high temperature of the compressed air passing therethrough and reduce the rate at which heat flows from the compressed air into the feathering spindle 64 and surrounding components.

Once the flow of compressed air has stopped (e.g., once the rotor has transitioned to autorotation) the surrounding atmosphere may cool a feathering spindle 64. The higher the altitude, the greater the cooling. For example, at certain altitudes, the atmospheric temperatures may typically be as low as negative 54 degrees Celsius (negative 65 degrees Fahrenheit).

A rotorcraft 10 in accordance with the present invention may include an oil circulation system. The system may pass oil through an annular cavity 114 defined by and between a spindle support 104 and a corresponding feathering spindle 64. In selected embodiments, a spindle support 104 may include ports 116 enabling a flow of oil to enter and exit a corresponding annular cavity 114. For example, in the illustrated embodiment, each spindle support 104 includes two ports 116a, 166b. A first port 116a may provide a location for oil to enter the annular cavity 114. A second port 116b may provide a location for oil to exit the annular cavity 114.

An oil circulation system may include various tubing 118 or conduits 118 conducting a flow of oil to and from the ports 116. In selected embodiments, the conduits 118 may extend down the center of a hub 44 to a rotary seal 120. The rotary seal 120 may provide fluid communication between portions of an oil circulation system (e.g., conduits 118) that rotate with respect to an airframe 12 and other portions or components that are fixed with respect to the airframe 12.

A flow of oil through the annular cavity 114 may lubricate the bearings 74 of a feathering spindle 64. The flow of oil may also regulate the temperature of the various components of a feathering spindle 64. For example, a feathering spindle 64 may be either cooled or warmed by the flow of oil.

A hub 44, feathering spindle 64, and rotor blade 42 arrangement in accordance with the present invention may provide an assembly that is rigid in the desired directions or degrees of freedom throughout the design temperature and load ranges. Accordingly, the hub 44, feathering spindle 64, and rotor blade 42 arrangement may ensure that the rotor 40 meets the flapping, lead-lag, and torsional stiffness requirements throughout the flight envelop. This may be accomplished by pre-loading of the bearings 74 of the feathering spindle 64 in the radial direction 66 and suitable interference fits between the root of the rotor blade 42, tension sleeve 72, bearings 74, and the hub 44 (e.g., spindle support 104). These, together with the temperature regulation imposed by the oil circulation system, may ensure that thermal expansion and contraction will not overload any components nor produce clearances negating the required rotor stiffness.

While an oil circulation system may not hold a feathering spindle 64 at a constant temperature, it may reduce the temperature range in which a feathering spindle 64 must operate. This temperature range may be selected or controlled such that the pre-loading of the bearings 74 and interference fits between components are sufficient to accommodate or resolve the thermal expansion and contraction associated with the temperature range.

During powering of a rotor 40 (e.g., operation of the tip jets 50), an oil circulation system may both lubricate a feathering spindle 64 (e.g., bearings 74) and remove heat therefrom. Conversely, during autorotative flight at low atmospheric temperatures, an oil circulation system may both lubricate the feathering spindle 64 (e.g., bearings 74) and transfer heat thereto.

In selected embodiments, a selected amount of warm air may be bled into a hub 44 and pass through the corresponding feathering spindles 64 and rotor blades 42. This warm air may aid in maintaining a feathering spindle 64 and surrounding components within a desired temperature range. Additionally, the warm air may provide anti-icing capabilities for the rotorcraft 10.

Figure 7:
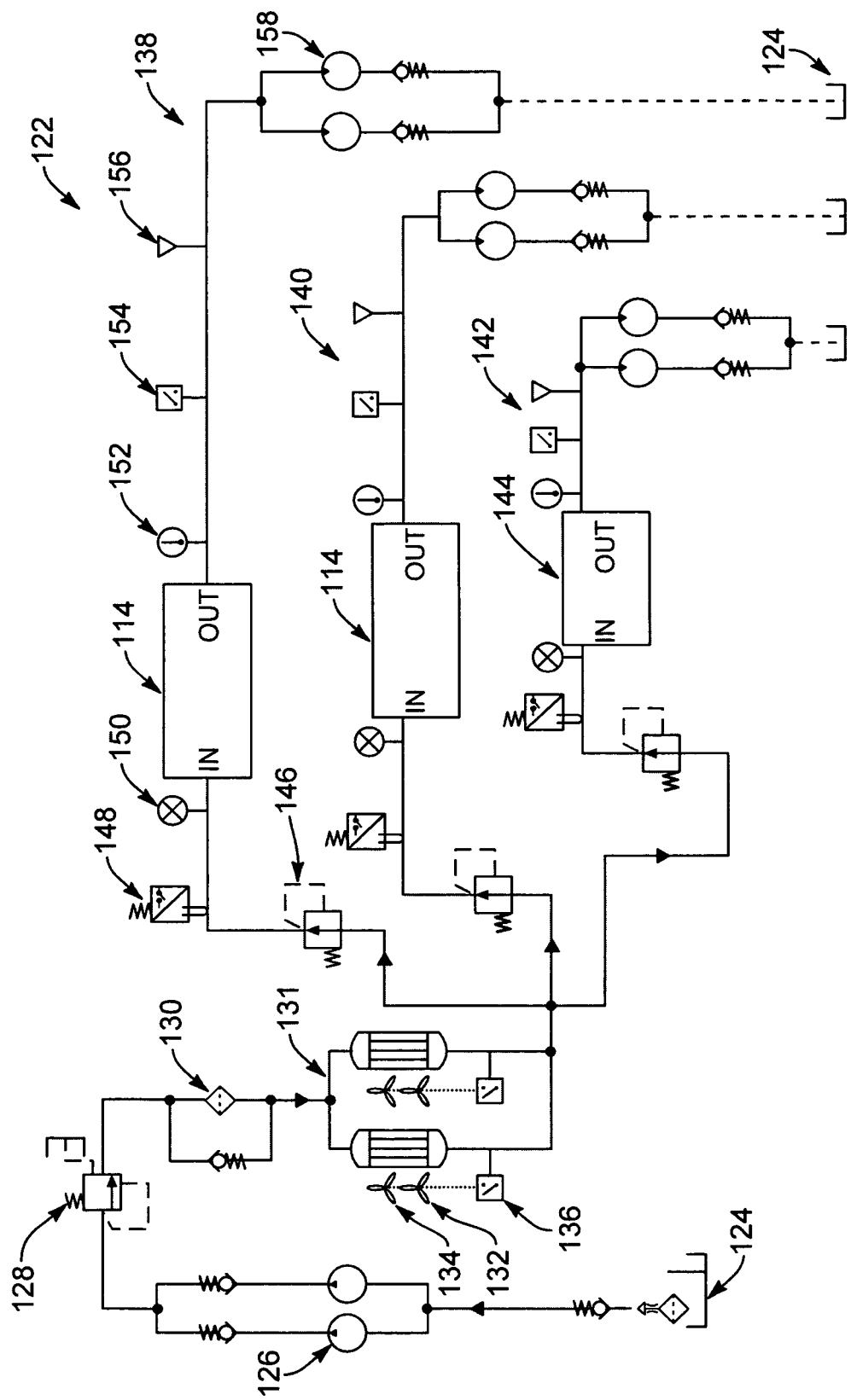
FIG. 7 is a schematic diagram of one embodiment of an oil circulation system in accordance with the present invention.

Referring to FIG. 7, an oil circulation system 122 in accordance with the present invention may actively heat or cool the flow of oil circulating therewithin. For example, when the flow of oil within the circulation system 122 is removing heat from a feathering spindle 64, one or more components within the circulation system 122 may remove heat from the flow of oil. Conversely, when the flow of oil within the circulation system 122 is heating a feathering spindle 64, one or more components within the circulation system 122 may heat the flow of oil.

Heat may be added to or removed from a flow of oil in any suitable manner. In selected embodiments, heating or cooling of a flow of oil may be directly linked to the processes or operation of other systems of the rotorcraft 10. For example, a circulation system 122 may heat a flow of oil using heat generated by one or more engines 48. Conversely, the heating and cooling imposed on the flow of oil by a circulation system 122 may be more independently produced.

In the illustrated embodiment, a circulation system 122 includes a reservoir 124 with a strainer and deaerator, one or more pumps 126 driven by one or more engines 48 (e.g., one or more pumps collectively pumping oil at about fifteen gallons per minute), a pressure relief subsystem 128 (e.g., a pressure relief valve set at about 125 pounds per square inch), a filter 130 (e.g., ten micron filter) with a bypass and indicator, and a heating/cooling subsystem 131. The heating/cooling system 131 includes one or more heat exchangers 132 (e.g., air-oil heat exchangers), one or more fans 134 for improving the efficiency of the heat exchangers 134, and one or more temperature switches 136 controlling the operation of the fans 134 according to the temperature of the flow of oil.

The illustrated circulating system 122 further includes multiple legs or branches 138, 140, 142. Each leg 138, 140, 142 may fulfill a different purpose. For example, one leg 138 may deliver a flow of oil to one annular cavity 114 corresponding to a first feathering spindle 64. One or more other legs 140 may deliver separate flows of oil to the annular cavities 114 of one or more other feathering spindles 64. Still other legs 142 may deliver separate flows of oil to other locations 144. In selected embodiments, such locations 144 may include other bearings within the rotor 40 (e.g., mast or main bearings 110, swash plate bearings, and the like).

In the illustrated embodiment, each leg 138, 140, 142 of a circulation system 122 includes a pressure regulator 146 (e.g., a regulator set at from 30 to 150, and typically about 100, pounds per square inch), a pressure switch 148 (e.g., a switch set with a maximum of about 40 to 100, and typically about 80, pounds per square inch and a minimum of 70 pounds per square inch), a pressure transducer 150 (e.g., a pressure transducer with a range from zero to about 120 pounds per square inch), a cavity 114 or location 114, 144 serviced by the oil, a temperature transducer 152 (e.g., a temperature transducer with a range from about zero to about 300 degrees Fahrenheit), a temperature switch 154, a chip indicator 156 with a strainer, and one or more scavenge elements 158. Once a flow of oil has passed through a leg 138, 140, 142, it may be returned to a reservoir 124.

In selected embodiments, the present invention may include one or more methods. For example, the present invention may include a method of assembly. Accordingly, in certain embodiments, a rotor 40 may be assembled by heating the hub 44 to a temperature enabling the outer races of the bearings 74 of the feathering spindle 64 to be fitted into position. Next, the seals 76, inner races, roller packs, and preload mechanism 84 may be fitted to the tension sleeve 72. The tension sleeve 72 may then be position in a spindle support 104 of a hub 44 by threading the tension sleeve 72 into the thrust flange 78. The preload mechanism 84 may be tightened to properly preload the bearings 74.

With the feathering spindle 64 in position and sealed, it may be ready to receive the root of a corresponding rotor blade 42 therewithin. In selected embodiments, the feathering spindle 64 and hub 44 (e.g., spindle support 104) may be heated by circulating hot oil through the annular cavity 114 therebetween. This heating may continue until the feathering spindle 64 has expanded sufficiently for the root of the rotor blade 42 to be inserted within the interior of the tensioning sleeve 72. A tool or jig may be used to align the rotor blade 42 and the pitch horn 80 to ensure the pitch of the blade 42 is proper. Finally, bolts 88 that were previously fitted to the root

What is claimed and desired to be secured by United States Letters Patent is:

1. A rotorcraft comprising:
an airframe;
at least one engine connected to the airframe;
a rotor connected to the airframe and defining axial and radial directions, the rotor comprising
a hub,
a rotor blade having a root and a tip and forming a conduit extending from the root to the tip, and
a feathering spindle connecting the rotor blade to the hub;
a flow of oil passing proximate the feathering spindle;
the flow of oil cooling the feathering spindle during take off and landing of the rotorcraft; and
the flow of oil heating the feathering spindle during travel of the rotorcraft during flight at flight travel altitudes;
wherein the feathering spindle defines an interior cavity extending in the radial direction therethrough; and
wherein the feathering spindle receives and retains the root of the rotor blade within the interior cavity.

2. The rotorcraft of claim 1, wherein the hub and feathering spindle combine to form an annular cavity therebetween.

3. The rotorcraft of claim 2, wherein the flow of oil passes into and out of the annular cavity.

4. The rotorcraft of claim 3, further comprising an oil system containing and motivating the flow of oil.

5. The rotorcraft of claim 4, wherein the oil system cools the flow of oil during take off and landing of the rotorcraft.

6. The rotorcraft of claim 5, wherein the oil system heats the flow of oil during travel of the rotorcraft at altitude.

7. The rotorcraft of claim 1, wherein the feathering spindle comprises at least one bearing interfacing with the hub.

8. The rotorcraft of claim 7, wherein the flow of oil lubricates the at least one bearing.

9. The rotorcraft of claim 1, further comprising a flow of compressed air generated by the at least one engine, the flow of compressed air passing through the interior cavity and through the conduit from the root to the tip of the rotor blade.

10. The rotorcraft of claim 9, wherein the feathering spindle comprises at least one tapered roller bearing interfacing with the hub.

11. The rotorcraft of claim 10, wherein the feathering spindle further comprises an inboard end and an outboard end, spaced in the radial direction from the inboard end.

12. The rotorcraft of claim 11, wherein the feathering spindle further comprises a thrust flange positioned proximate the inboard end, the thrust flange comprising a pitch arm extending therefrom.

13. The rotorcraft of claim 12, wherein the root of the rotor blade extends in the radial direction through the interior cavity and engages the thrust flange.

14. A rotorcraft in one of take off and landing mode, the rotorcraft comprising:
an airframe;
at least one engine connected to the airframe;
a rotor connected to the airframe and defining axial and radial directions, the rotor comprising
a hub,
a rotor blade having a root and a tip and forming a conduit extending from the root to the tip,
a feathering spindle comprising at least one bearing interfacing with the hub,
the feathering spindle defining an interior cavity extending in the radial direction therethrough, and
the feathering spindle receiving and retaining the root of the rotor blade within the interior cavity;
a flow of compressed air generated by the at least one engine;
the flow of compressed air passing through the interior cavity and through the conduit from the root to the tip of the rotor blade;
the flow of compressed air transferring heat to the feathering spindle;
a flow of oil passing proximate the feathering spindle;
the flow of oil lubricating the at least one bearing; and
the flow of oil removing heat from the feathering spindle.

15. A method comprising:
selecting a rotorcraft comprising
an airframe,
at least one engine connected to the airframe, and
a rotor connected to the airframe and defining axial and radial directions, the rotor comprising a hub, a rotor blade having a root and a tip and forming a conduit extending from the root to the tip, and a feathering spindle connecting the rotor blade to the hub, the feathering spindle defining an interior cavity extending in the radial direction therethrough, the feathering spindle receiving and retaining the root of the rotor blade within the interior cavity;
executing, with the rotorcraft, a takeoff;
passing, during the takeoff, a flow of compressed air generated by the at least one engine through the interior cavity and through the conduit from the root to the tip of the rotor blade;
transferring, during the takeoff by the flow of compressed gas, heat to the feathering spindle;
passing, during the takeoff, a flow of oil proximate the feathering spindle;
lubricating, by the flow of oil during the takeoff, the feathering spindle; and
removing, during the takeoff by the flow of oil, heat from the feathering spindle.

16. The method of claim 15, further comprising:
flying the rotorcraft at a flight travel altitude; and
losing, by the feathering spindle during the flying, heat to the surrounding atmosphere.

17. The method of claim 16, further comprising:
passing, during the flying, the flow of oil proximate the feathering spindle;
lubricating, by the flow of oil during the flying, the feathering spindle; and
transferring, by the flow of oil during the flying, heat to the feathering spindle.

18. The method of claim 17, wherein the flying comprises flying the rotorcraft at an advance ratio greater than 0.5.

* * * * *